(12) United States Patent
Hashimoto et al.

(10) Patent No.: US 10,182,576 B2
(45) Date of Patent: Jan. 22, 2019

(54) SHUTTER PIECE AND FOOD SHAPING DEVICE

(71) Applicant: RHEON AUTOMATIC MACHINERY CO., LTD., Tochigi (JP)

(72) Inventors: Shigeru Hashimoto, Tochigi (JP); Takeshi Oderaotoshi, Tochigi (JP)

(73) Assignee: RHEON AUTOMATIC MACHINERY CO., LTD., Tochigi (JP)

( * ) Notice: Subject to any disclaimer, the term of this patent is extended or adjusted under 35 U.S.C. 154(b) by 38 days.

(21) Appl. No.: 15/111,051

(22) PCT Filed: Jan. 14, 2015

(86) PCT No.: PCT/JP2015/050777
§ 371 (c)(1),
(2) Date: Jul. 12, 2016

(87) PCT Pub. No.: WO2015/115178
PCT Pub. Date: Aug. 6, 2015

(65) Prior Publication Data
US 2016/0353750 A1    Dec. 8, 2016

(30) Foreign Application Priority Data

Jan. 29, 2014    (JP) .................................. 2014-014735
Oct. 17, 2014    (JP) .................................. 2014-212346

(51) Int. Cl.
*A23B 4/02*    (2006.01)
*A21C 11/10*    (2006.01)
(Continued)

(52) U.S. Cl.
CPC ............ *A21C 11/10* (2013.01); *A21C 11/103* (2013.01); *A21C 11/16* (2013.01); *A23P 30/25* (2016.08)

(58) Field of Classification Search
CPC .. A21D 6/00; B26D 1/12; A21C 11/10; A21C 11/103; A21C 11/16; A23P 30/25
(Continued)

(56) References Cited

U.S. PATENT DOCUMENTS 4,636,158 A    1/1987    Huang
5,031,520 A *  7/1991    Tsay .................... A21C 11/103
                                          425/133.1
(Continued)

FOREIGN PATENT DOCUMENTS

CN    1059639    3/1992
CN    1074804    8/1993
(Continued)

OTHER PUBLICATIONS

Office Action issued in China Counterpart Patent Appl. No. 2015800062956, dated Apr. 26, 2017 , along with an English translation thereof.
(Continued)

*Primary Examiner* — Dana Ross
*Assistant Examiner* — Joseph Iskra
(74) *Attorney, Agent, or Firm* — Greenblum & Bernstein, P.L.C.

(57) ABSTRACT

To provide a shutter piece in a food shaping device that is capable of opening and closing an enclosure surrounded by a plurality of shutter pieces, the shutter piece including a flexure allowance part between a rotation center position of a shutter piece and a distal end part of the shutter piece to allow flexure of a distal-end side portion of the shutter piece in the opposite direction from a closing opening direction
(Continued)

during a closing operation of the shutter piece, in which the flexure allowance part is constituted by a slit, a cutaway part, or a hole, and the flexure allowance part includes a flexure-amount adjustment mechanism to adjust the amount of flexure of the distal-end side portion of the shutter piece.

16 Claims, 10 Drawing Sheets

(51) Int. Cl.
    *A21C 11/16*     (2006.01)
    *A23P 30/25*     (2016.01)

(58) Field of Classification Search
    USPC .... 425/287, 132, 142, 406, 466; 83/51, 591, 83/672, 932; 366/85, 301; 426/516, 518, 426/503; 99/494
    See application file for complete search history.

(56) References Cited

U.S. PATENT DOCUMENTS

| | | | |
|---|---|---|---|
| 5,153,010 | A | 10/1992 | Tashiro et al. |
| 5,190,770 | A | 3/1993 | Tashiro |
| 5,518,391 | A * | 5/1996 | Tashiro ................ A21C 11/103 425/132 |
| 6,892,630 | B1 | 5/2005 | Huang |
| 7,901,198 | B2 * | 3/2011 | Onoguchi ............ A21C 11/103 425/289 |
| 2003/0190391 | A1 * | 10/2003 | Kobayashi ............ A21C 9/063 426/297 |
| 2005/0042350 | A1 | 2/2005 | Kobayashi et al. |
| 2009/0139383 | A1 | 6/2009 | Tsai |
| 2009/0232924 | A1 * | 9/2009 | Onoguchi ............ A21C 11/103 425/306 |
| 2014/0234498 | A1 * | 8/2014 | Morikawa ............ A21C 9/063 426/283 |
| 2014/0287113 | A1 * | 9/2014 | Morikawa ............ A21C 9/063 426/283 |

FOREIGN PATENT DOCUMENTS

| | | |
|---|---|---|
| CN | 1135837 | 11/1996 |
| CN | 1208587 | 2/1999 |
| CN | 101340817 | 1/2009 |
| EP | 0628250 | 12/1994 |
| JP | 3-175925 | 7/1991 |
| JP | 4-11844 | 1/1992 |
| JP | 7-246080 | 9/1995 |
| JP | 2729898 | 3/1998 |
| JP | 2799941 | 9/1998 |
| JP | 2000-232845 | 8/2000 |
| JP | 2003-009838 | 1/2003 |
| JP | 2003-052299 | 2/2003 |
| JP | 2003-079356 | 3/2003 |
| JP | 3403660 | 5/2003 |
| JP | 2003-180321 | 7/2003 |
| JP | 2003-304853 | 10/2003 |
| JP | 2003-310141 | 11/2003 |
| JP | 2003-333977 | 11/2003 |
| JP | 2003-339302 | 12/2003 |
| JP | 2004-041051 | 2/2004 |
| JP | 2004-201504 | 7/2004 |
| JP | 3587459 | 11/2004 |
| JP | 2007-190011 | 8/2007 |
| JP | 2008-259520 | 10/2008 |
| JP | 4246789 | 4/2009 |
| JP | 2010063416 | * 3/2010 |
| JP | 2010-110286 | 5/2010 |
| JP | 2013-46606 | 3/2013 |
| TW | 339262 | 9/1998 |
| WO | 2013/139853 | 9/2013 |

OTHER PUBLICATIONS

ISR issued in PCT/JP2015/050777, dated Mar. 24, 2015.
Search Report issued in European Patent Office (EPO) Patent Application No. 15743676.7, dated Jul. 13, 2017.
Office Action issued in Republic of Korea Counterpart Patent Appl. No. 10-2016-7023142, dated Dec. 12, 2017, along with an English translation thereof.
Office Action issued in Taiwan Counterpart Patent Appl. No. 103139564, dated Oct. 27, 2017.

* cited by examiner

SHUTTER PIECE AND FOOD SHAPING DEVICE

TECHNICAL FIELD

The present invention relates to a shutter piece of a food shaping device for producing a crusted food including a filling (inclusion material) wrapped with a crust (an outer coating material), such as a sort of bun with bean paste filling (a manjū) or a round bread with bean paste filling (an anpan), and relates to the food shaping device. More particularly, the present invention relates to a shutter piece of a food shaping device that opens and closes an enclosure formed by a plurality of shutter pieces having rotating shafts on the same circumference and being capable of rotating on the respective rotating shafts in the center of the shutter pieces so as to cut and shape a bar-shaped food dough or to shape by wrapping a filling with a dough of crust, and relates to the thod shaping device.

BACKGROUND ART

A cutting-shaping shutter device which cuts and shapes a bar-shaped crusted food dough (discharged continuously in a dual structure consisting of a filling and a crust) supplied into an enclosure closed around by a plurality of rotating shutter pieces of the shutter device by opening and closing the enclosure, are conventionally known, and the shutter piece of the shutter device is also conventionally known. Conventional techniques related to this type of shutter device are described in Japanese Patents Nos. 2729898, 2799941, and 3403660 related to applications of the present applicant, for example.

Furthermore, a food shaping device that performs wrapping shaping to wrap a filling with a substantially-discoidal dough piece and that includes a plurality of rotating shutter pieces is described in Japanese Patent No. 3587459, for example.

CITATION LIST

Patent Literatures

Patent Literature 1: Japanese Patent No. 2729898
Patent Literature 2: Japanese Patent No. 2799941
Patent Literature 3: Japanese Patent No. 3403660
Patent Literature 4: Japanese Patent No. 3587459

DISCLOSURE OF INVENTION

Problem to be Solved by the Invention

In a shutter device of a conventional food shaping device, dough residues sometimes occur during cutting-shaping or wrapping-shaping of dough. The dough residues are caused due to dough entering in a gap between adjacent shutter pieces and adhering to the shutter pieces. Causes of entrance of dough in the gap are distortion of the shutter pieces during molding, phase shifting due to backlash of a shutter-piece drive unit of the shutter device, and the like. Because wear of a portion where parts slide on each other is generally unavoidable, the gap tends to enlarge as the operating time of the shutter utter device accumulates. An enlarged gap between the shutter pieces due to wear may increase the dough residues and adversely affect the working environment.

The rotational shutter device of the conventional food shaping device solves the problem of an increase of the dough residues described above by bringing the adjacent shutter pieces into pressing contact with each other to be capable of sliding on each other. That is, the positions of blade edges of the shutter pieces are set to be adjustable, and provision of the shutter pieces to press the adjacent shutter pieces against each other narrows the gap described above and reduces occurrence of the dough residues. Although reducing occurrence of the dough residues, this method promotes wear of the shutter pieces and accordingly problems in operability and economic efficiency, such as repeated blade adjustments or replacement with new shutter pieces, still remain.

Furthermore, because the adjacent shutter pieces rotate while being in pressing contact with each other, thermal expansion of the shutter pieces occurs when the food shaping device is operated for a long time or shapes high temperature dough, and the shutter pieces are pressed harder. As a result, the load on the drive unit may become excessive, which may cause problems such as a damage of the drive unit. Because slide portions of the shutter pieces that are pressed against each other also wear at that time, the dough-residue prevention effect cannot be expected to continue for a long term.

The present invention has been achieved in view of the above problems, and an object of the present invention is to provide a shutter piece and a food shaping device, in which a contact pressure at which a distal end portion of the shutter piece is in contact with an adjacent shutter piece to be capable of sliding thereon is always kept substantially constant.

Means for Solving Problem

In order to solve the above problems and to achieve the above object, a shutter piece according to a first aspect of the present invention is a shutter piece of a food shaping device that is capable of opening and closing an enclosure surrounded by a plurality of the shutter pieces, the shutter piece comprising a flexure allowance part that allows flexure of a distal-end side portion of the shutter piece during a closing operation of the shutter piece in an opposite direction from a closing operation direction between a rotation center position of the shutter piece and a distal end portion of the shutter piece.

According to a shutter piece of a second aspect of the present invention, in the shutter piece according to the first aspect, the flexure allowance part is constituted by a slit, a notch part, or a hole.

According to a shutter piece of a third aspect of the present invention, in the shutter piece according to the first aspect or the second aspect, the flexure allowance part includes a flexure-amount adjustment mechanism to adjust an amount of flexure of the distal-end side portion of the shutter piece.

According to a shutter piece of a fourth aspect of the present invention, in the shutter piece according to any of the first aspect to the third aspect, the flexure allowance part is constituted by a slit, and a slit-gap restricting member that is capable of restricting reduction of a slit gap during flexure of the distal-end side portion is included in the slit.

According to a shutter piece of a fifth aspect of the present invention, in the shutter piece according to any of the first aspect to the fourth aspect, the distal-end side portion includes a heat releasing part that releases heat of the shutter piece.

According to a shutter piece of a sixth aspect of the present invention, in the shutter piece according to any of the first aspect to the fifth aspect, the heat releasing part is formed as a hole or a groove that is open on both surfaces of the distal-end side portion.

According to a shutter piece of a seventh aspect of the present invention, in the shutter piece according to any of the first aspect to the sixth aspect, half shutter pieces of a same shape are provided to an attachment base member including an attachment hole to be attached to rotating shafts of a shutter device of the food shaping device, respectively, so as to be symmetrical and be capable of being adjusted individually in directions toward or away from each other.

A food shaping device according to an eighth aspect of the present invention is a food shaping device including the shutter piece according to any of the first aspect to the seventh aspect, the food shaping device having a configuration comprising a plurality of the shutter pieces removably provided to a plurality of rotating shafts included in a shutter device of the food shaping device, respectively, a food-dough supply unit that supplies food dough consisting of a crust and a filling in a space formed by the shutter pieces that are opened and closed by rotation of the rotating shafts, and a conveyance unit that conveys food products shaped by a closing operation of the shutter pieces to a next step, wherein the closing operation is performed in the configuration while the flexure allowance part included in each of the shutter pieces allows flexure of the distal-end side portion of each of the shutter pieces in the opposite direction from the closing operation direction.

Effect of the Invention

According to the present invention, the shutter piece includes a flexure allowance part that allows flexure of a distal-end side portion in an opposite direction from a closing operation direction during a closing operation. Therefore, a contact pressure at which the distal end portion of the shutter piece is in contact with the adjacent shutter piece to be capable of sliding thereon can be always kept substantially constant. Accordingly, the conventional problems described above can be solved.

EMBODIMENT FOR CARRYING OUT THE INVENTION

Configurations of a food shaping device and a shutter piece used in a shutter device of the food shaping device according to embodiments of the present invention are described below with reference to the accompanying drawings.

Figure 1:
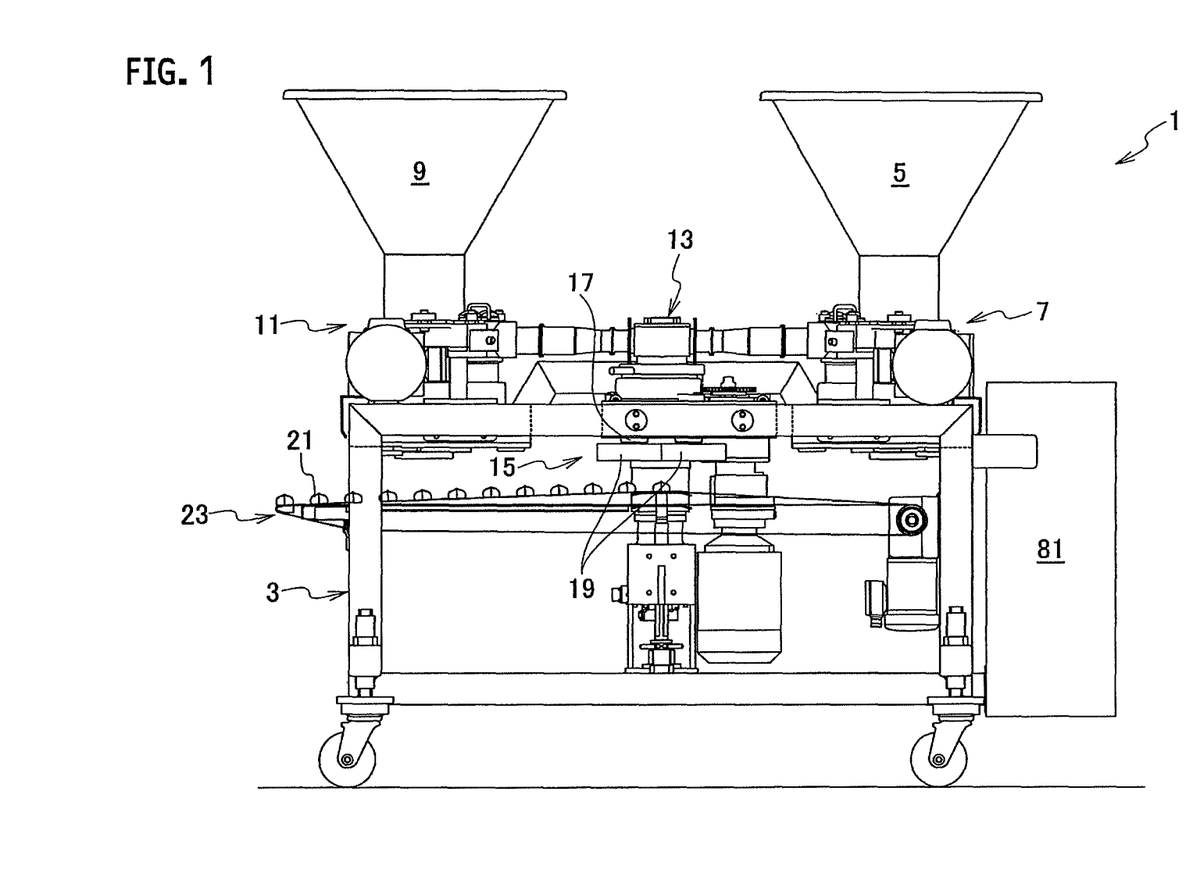
FIG. 1 is a front view for explaining a food shaping device according to an embodiment of the present invention.

A food shaping device 1 according to a first embodiment of the present invention has a configuration shown in FIG. 1. Because a general configuration of the food shaping device 1 is already publicly known, the general configuration is described schematically. The food shaping device 1 includes a body frame 3. A crust supplying device 7 including a first hopper 5 which supplies, for example, a crust; and a filling supplying device 11 including a second hopper 9 which supplies, for example, a filling, are provided on the body frame 3. An overlay nozzle device 13 is further provided to the body frame 3. The overlay nozzle device 13 performs an operation to overlay the crust around the filling which is supplied in a bar shape from the filling supplying device 11 in a state that the crust wraps the filling.

A shutter device 15 which cuts the bar-shaped food dough flowing downward from the overlay nozzle device 13 is provided under the overlay nozzle device 13. The shutter device 15 has a configuration including shutter pieces 19 on a plurality of rotating shafts 17 that are placed on a same circle at equal intervals, respectively. When the bar-shaped food dough moves downward in an area surrounded by the shutter pieces 19, the shutter device 15 operates the shutter pieces 19 to be opened and closed to perform to cut and shape the crusted food dough, thereby achieving an operation to manufacture food products 21 including the filling wrapped around with the crust.

A conveyance device 23 such as a belt conveyer for conveying the manufactured food products 21 to a next step is provided under the shutter device 15. The food shaping device 1 also includes a control device 81 that controls the entire operation of the food shaping device 1.

To manufacture the food products 21 using the food shaping device 1 configured as described above, distal-end portions of the respective shutter pieces 19 in the shutter device 15 repeatedly perform an opening/closing operation in a state of being in contact with the adjacent shutter pieces 19. Therefore, when the device is used for a long time, it is likely that the shutter pieces 19 are thermally expanded due to frictional heat or that wear occurs at the distal end portions of the shutter pieces 19. In this example, the food shaping device is not limited to the configuration described above. Another shutter device of a food-product shaping device in which a food-dough supply unit: supplies a flat crust into a space formed by shutter pieces that perform an opening/closing operation and simultaneously supplies a filling, and in which a periphery portion of the crust is gathered toward the center so as to manufacture foodstuffs, as described in Patent Literature 4 listed above, also has the problems described above.

Figure 2:
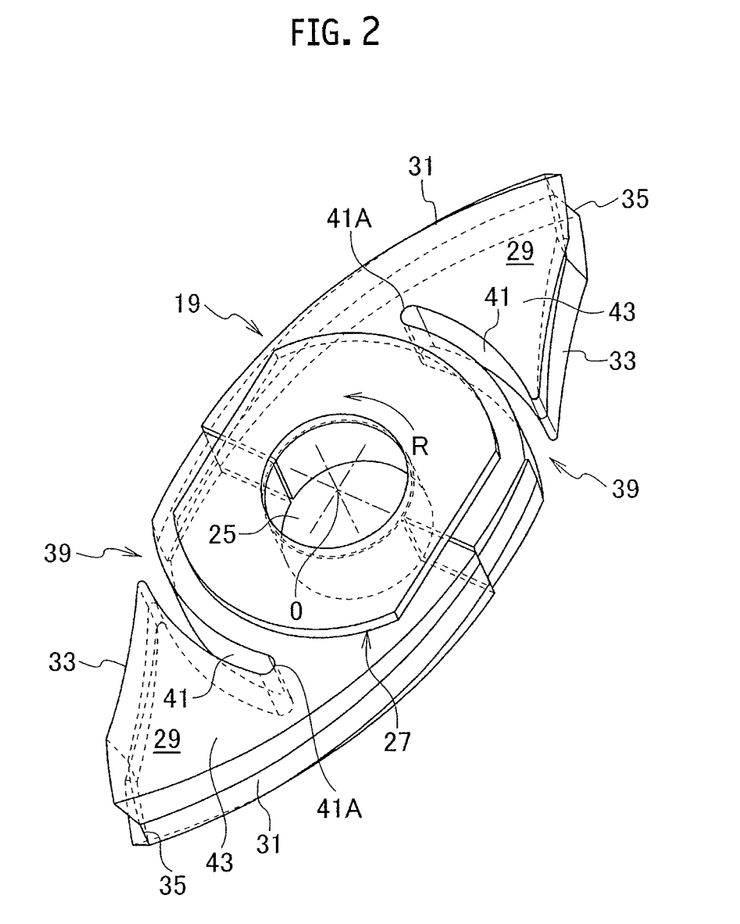
FIG. 2 is a perspective view for explaining a shutter piece according to a first embodiment.

The shutter piece 19 according to the present embodiment is configured as shown in FIG. 2. That is, the shutter piece 19 includes an attachment base 27 in which an attachment hole 25 for attachment to the corresponding rotating shaft 17 of the shutter device 15 is formed. Plate-like half shutter pieces 29 of the same shape are provided in an integrated manner to the attachment base 27. The half shutter pieces 29 are provided to be point-symmetric around an axis center O of the attachment hole 25. That is, the shutter piece 19 is constituted by the half shutter pieces 29 of the same shape, which are placed in a point-symmetric manner. The shutter piece 19 can be configured in a mode in which the half shutter pieces 29 are integrated in advance, that is, the entire shutter piece 19 can be formed of one plate material.

Figure 3:
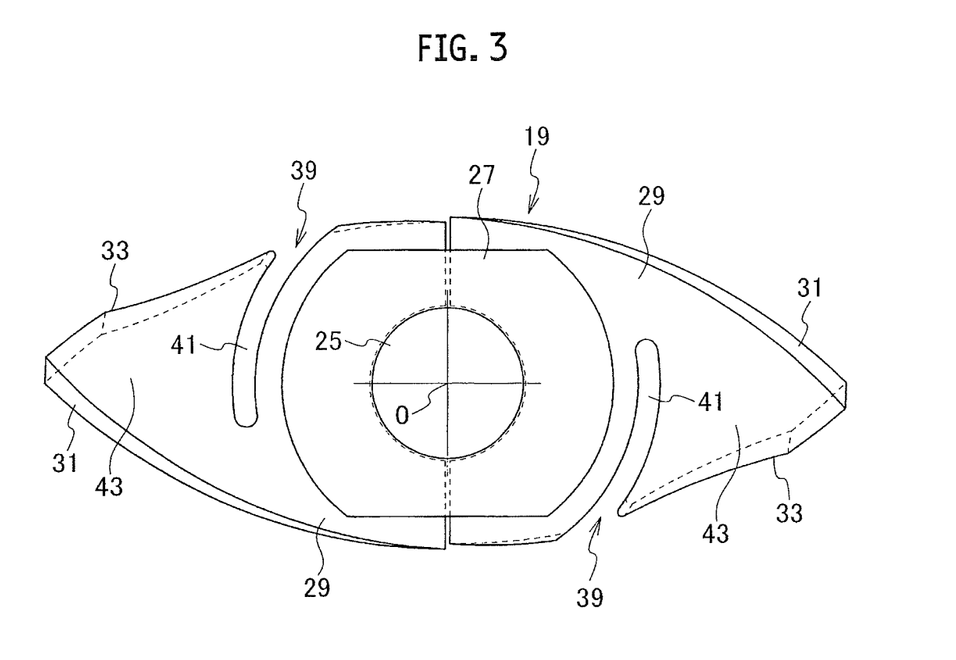
FIG. 3 is a top view for explaining the shutter piece according to the first embodiment.

Because the half shutter pieces 29 included in the shutter piece 19 have the same shape, a configuration of one of the half shutter pieces 29 is described in detail and constituent elements having the same functions in the other half shutter piece 29 are denoted by like reference numerals. The half shutter piece 29 is formed of a plate-like member. The half shutter piece 29 is formed to be wider at a proximal end side attached to the attachment base 27 and to have a shape having a width gradually narrowing as approaching from the proximal end side to a distal end side. A pressing side surface 31 that performs an operation to form an area surrounded by the shutter pieces 19 and to press the crust of the food dough during the closing operation is formed to be convex, and a non-pressing side surface 33 on the opposite side is formed to be concave. An intersection position between the pressing side surface 31 and the non-pressing side surface 33 is formed at a distal end part 35.

Figures 4A, 4B, 4C, 4D:
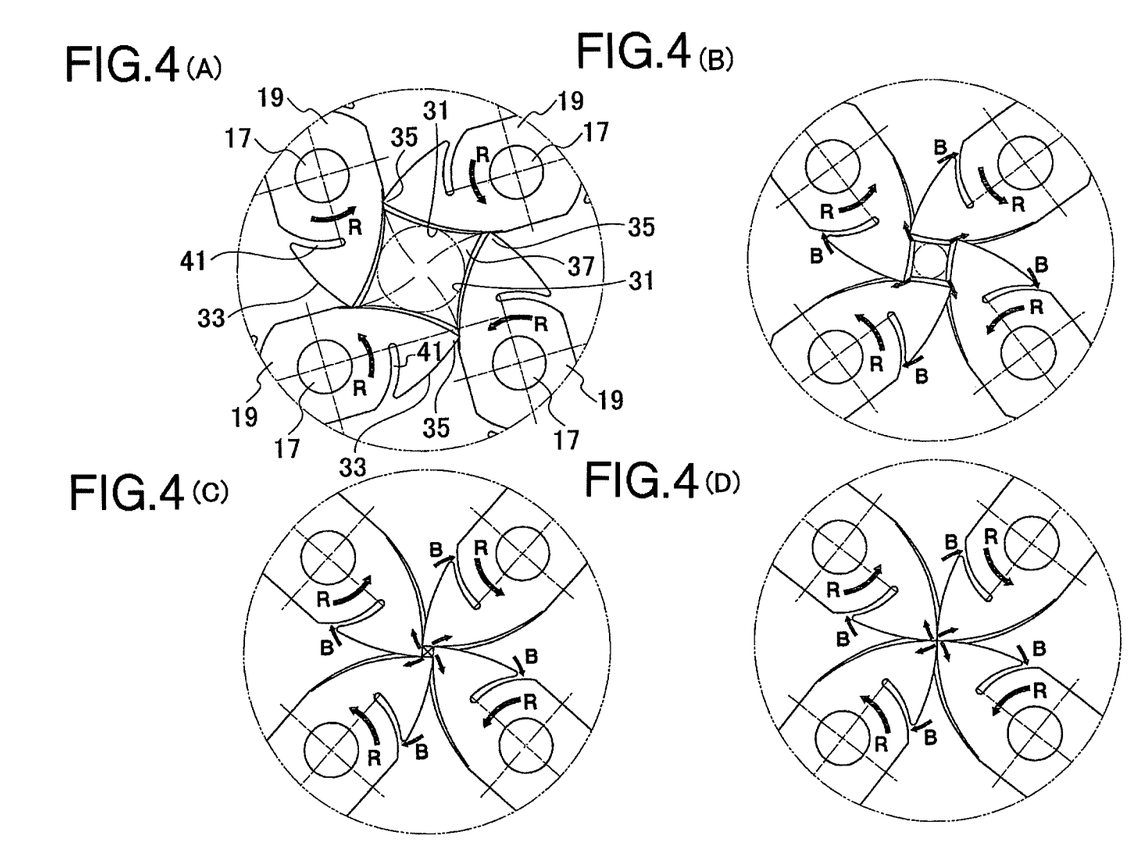
FIGS. 4(A) to 4(D) are explanatory diagrams of operations of the shutter piece according to the first embodiment.

More specifically, as shown in FIG. 4 (parts of the shutter pieces 19 are omitted in FIG. 4 because the shutter pieces 19 are point-symmetric), the pressing side surface 31 is formed as a sliding contact surface with which the distal end part 35 of the adjacent shutter piece 19 slidingly contacts when the rotating shafts 17 of the shutter device 15 are rotated in the direction of arrows R to perform an operation of closing a surround area 37 surrounded by the shutter pieces 19 until the surround area 37 becomes zero. Furthermore, the pressing side surface 31 is formed into a convex curve including a protruding part that protrudes in a direction orthogonal to the thickness direction of the half shutter piece 29, that is, in the rotating direction (the direction of the arrow R) of the shutter piece 19. A protrusion amount of the protruding part with respect to upper and lower plane surfaces of the half shutter piece 29 is formed to gradually increase as approaching from the proximal end side to the distal end part 35.

The non-pressing side surface 33 is formed to be capable of allowing rotation of the distal end part 35 of the adjacent shutter piece 19 when each of the shutter pieces 19 further rotates in the direction of the arrow R to perform the opening operation after the surround area 37 has become zero. That is, the non-pressing side surface 33 is formed into a concave curve that is concave in a direction orthogonal to the thickness direction of the half shutter piece 29, that is, in the rotation direction of the shutter piece 19 (the direction of the arrow R). A concavity amount with respect to the upper and lower plane surfaces of the half shutter piece 29 is formed to gradually increase as approaching from the proximal end side to the distal end part 35.

As shown in FIG. 4(A), when the shutter pieces 19 are rotated in the direction of the arrows R to perform the closing operation to reduce the surround area 37 surrounded by the shutter pieces 19, the distal end parts 35 of the respective shutter pieces 19 are in a state of being in pressing contact with the pressing side surfaces 31 of the adjacent shutter pieces 19 to be capable of sliding thereon. Therefore, gaps (clearances) between the distal end parts 35 of the respective shutter pieces 19 and the pressing side surfaces 31 of the adjacent shutter pieces 19 are kept substantially zero.

If the distal end parts 35 of the respective shutter pieces 19 are always in pressing contact with the pressing side surfaces 31 of the adjacent shutter pieces 19 in the manner described above, the distal end parts 35 are easily worn and frictional heat occurs to thermally expand the shutter pieces 19, which may increase the load on the shutter device 15. Therefore, in the present embodiment, the shutter piece 19 has a configuration that can allow flexure of the distal-end part side of the shutter piece 19 in the opposite direction from the closing operation direction during the closing operation of the shutter piece 19.

More specifically, between the attachment base member 27 and the distal end part 35 in each of the half shutter pieces 29 constituting the shutter piece 19, a flexure allowance part 39 that allows flexure of the distal-end part side in the opposite direction from the closing operation direction is provided. In the present embodiment, a slit 41 formed in each of the half shutter pieces 29 from the non-pressing side surface 33 toward the pressing side surface 31 is shown as an example of the flexure allowance part 39. A distal end position 41A of the slit 41 becomes a pivot point when a distal-end side portion 43 of the half shutter piece 29 flexes.

The distal end position 41A can have an arbitrary shape and an arbitrary position. However, to easily cause flexure of the distal-end side portion 43, the position of the distal end position 41A is preferably at a desired position near a position on a line connecting the center position O of the attachment hole 25 and the distal end part 35 or between a position on the line and the pressing side surface 31.

With the configuration described above, when the distal end part 35 of each of the shutter pieces 19 is brought to hard pressing contact with the pressing side surface 31 of the adjacent shutter piece 19 during the closing operation of the shutter piece 19 in the manner described above, the distal-end side portion 43 flexes to reduce the gap in the slit 41. Therefore, hard pressing contact of the distal end part 35 with the pressing side surface 31 of the adjacent shutter piece 19 is released. Accordingly, the distal end part 35 of each of the shutter pieces 19 always smoothly slidingly contacts with the pressing side surface 31 of the adjacent shutter piece 19 and thus excessive load can be suppressed.

That is, the contact pressure at which the distal end part 35 of each of the shutter pieces 19 contacts with the pressing side surface 31 of the adjacent shutter piece 19 to be capable of sliding thereon is always kept at an appropriate value.

Furthermore, when the closing operation is performed in a state where the distal end part 35 of the shutter piece 19 always slidingly contacts with the pressing side surface 31 of the adjacent shutter piece 19, frictional heat occurs at the sliding portion and may thermally expand the shutter piece 19. In this case, due to the thermal expansion of the shutter piece 19, the distal end part 35 of the shutter piece 19 presses the pressing side surface 31 of the adjacent shutter piece 19 harder. However, because of presence of the slit 41, flexure is caused in the distal-end side portion 43 by reaction force during the pressing. Therefore, even when the shutter piece 19 is thermally expanded, the distal end part 35 of the shutter piece 19 and the pressing side surface 31 of the adjacent shutter piece 19 can slide on each other. That is, the contact pressure is always kept at an appropriate value.

Figure 5:
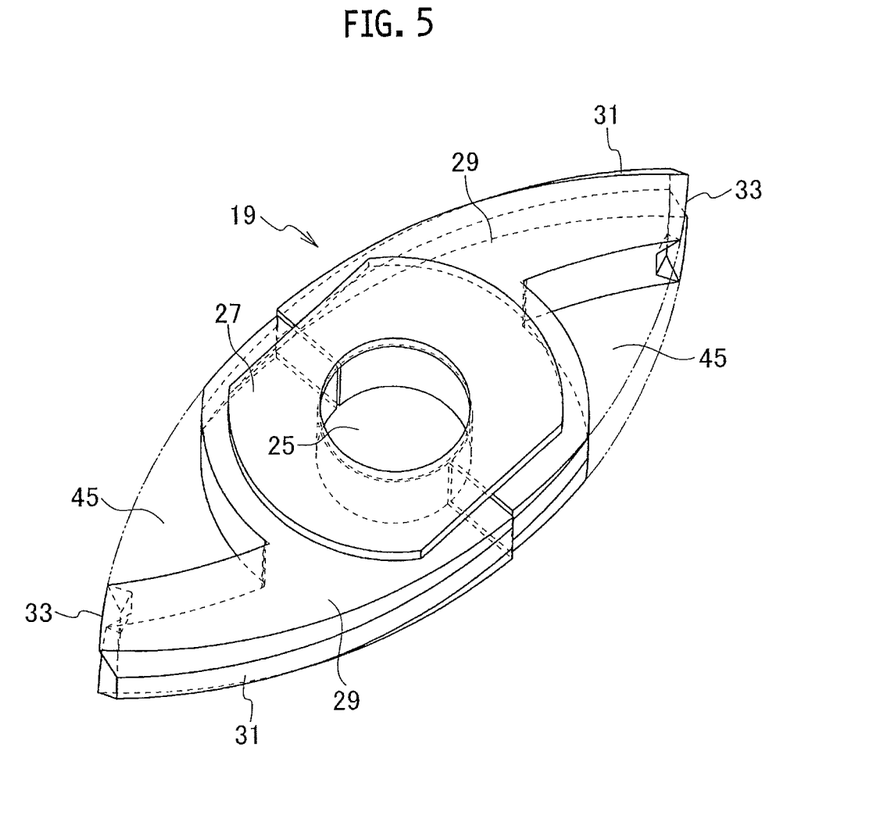
FIG. 5 is a perspective view for explaining a shutter piece according to a second embodiment.
Figure 6:
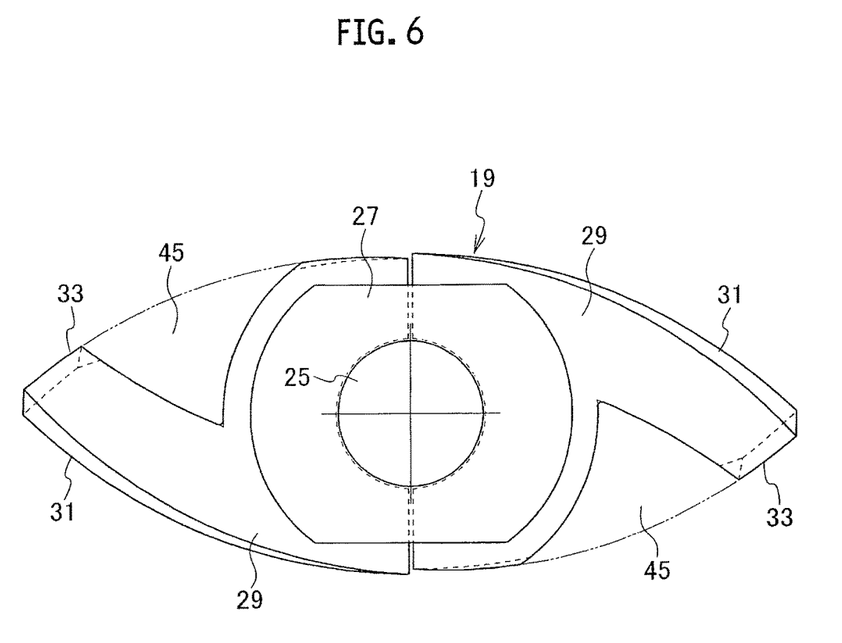
FIG. 6 is a top view for explaining the shutter piece according to the second embodiment.

The present invention is not limited only to the embodiment described above and the present invention can be also carried out by other modes with appropriate modifications. That is, in a second embodiment of the present invention, the flexure allowance part 39 can be configured to have a notch part 45 of an appropriate shape and an appropriate size, instead of the slit 41, formed on the side of the non-pressing side surface 33 as shown in FIGS. 5 and 6. That is, it suffices to form the flexure allowance part 39 that can suppress the contact pressure between the distal end part 35 of the shutter piece 19 and the pressing side surface 31 of the adjacent shutter piece 19 from becoming excessive. Therefore, a circular hole or an elongate hole can alternatively be formed instead of the slit 41. The slit 41 can be formed to have various shapes, such as a linear slit, a curved slit, a waveform slit, or an L-shaped slit.

Figure 7:
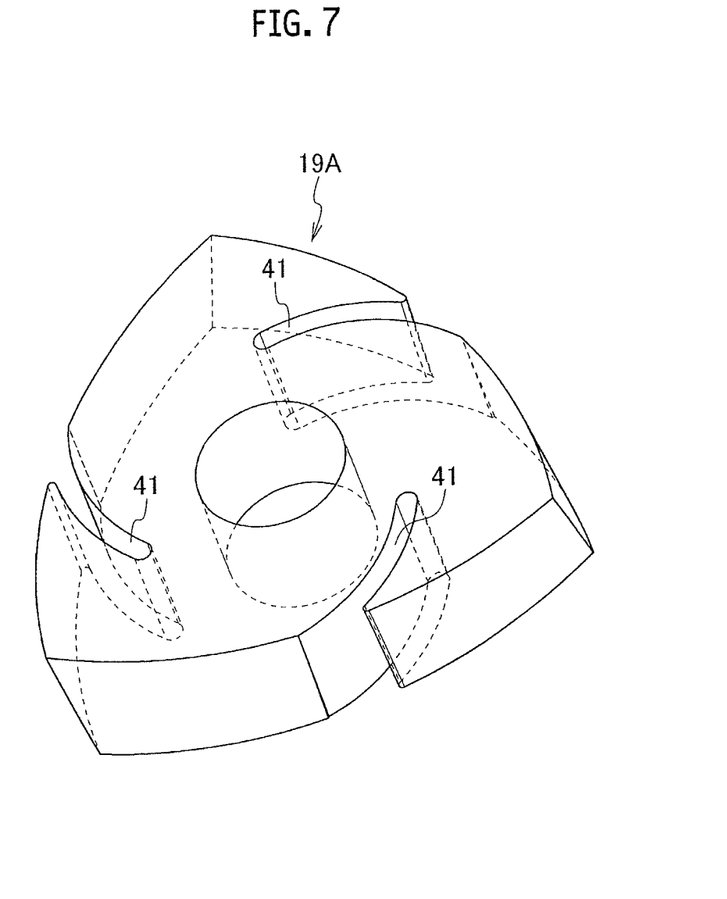
FIG. 7 is an explanatory diagram of a shutter piece according to a third embodiment.

FIG. 7 shows a shutter piece according to a third embodiment of the present invention. A shutter piece 19A according to the third embodiment has a configuration in which the slits 41 are formed in a shutter piece shown in FIG. 13 of Patent Literature 1 or FIG. 8 of Patent Literature 2 listed above. Also with this configuration, effects identical to those in the configuration described above can be achieved.

Figure 8:
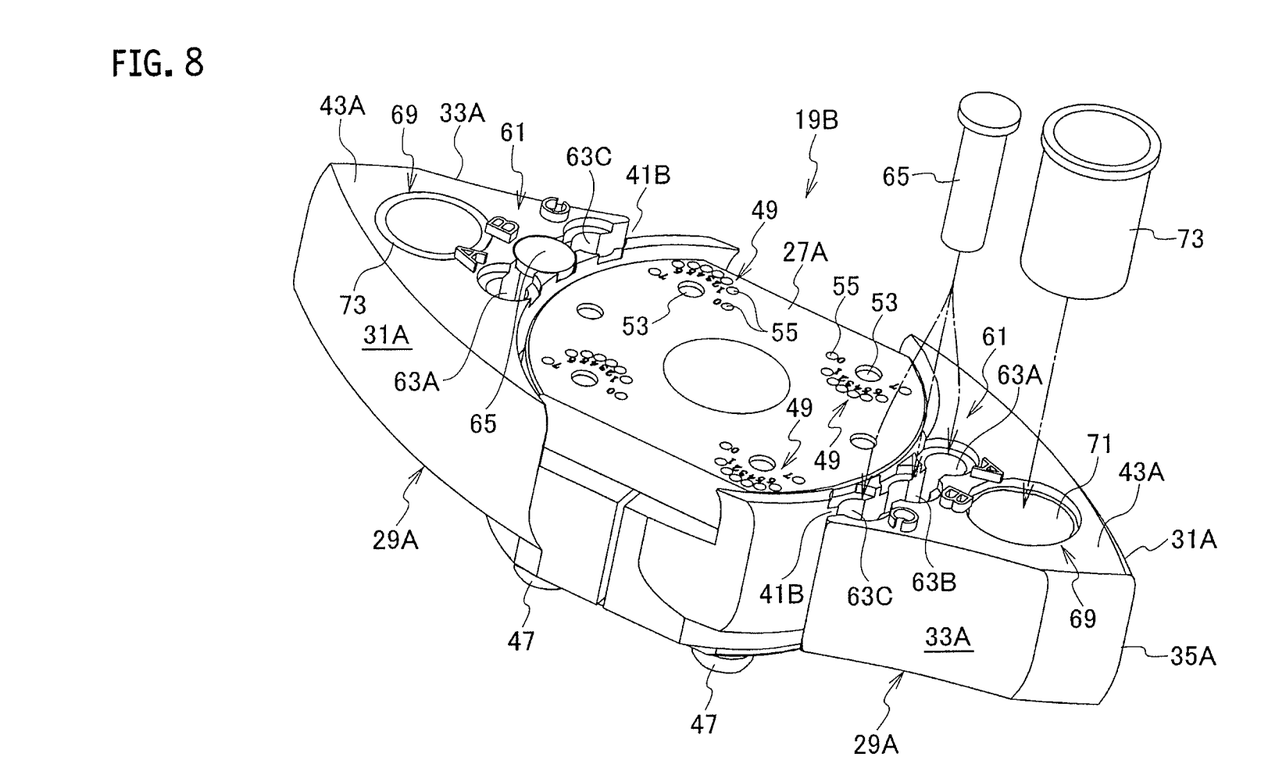
FIG. 8 is a perspective view for explaining a shutter piece according to a fourth embodiment.
Figure 9:
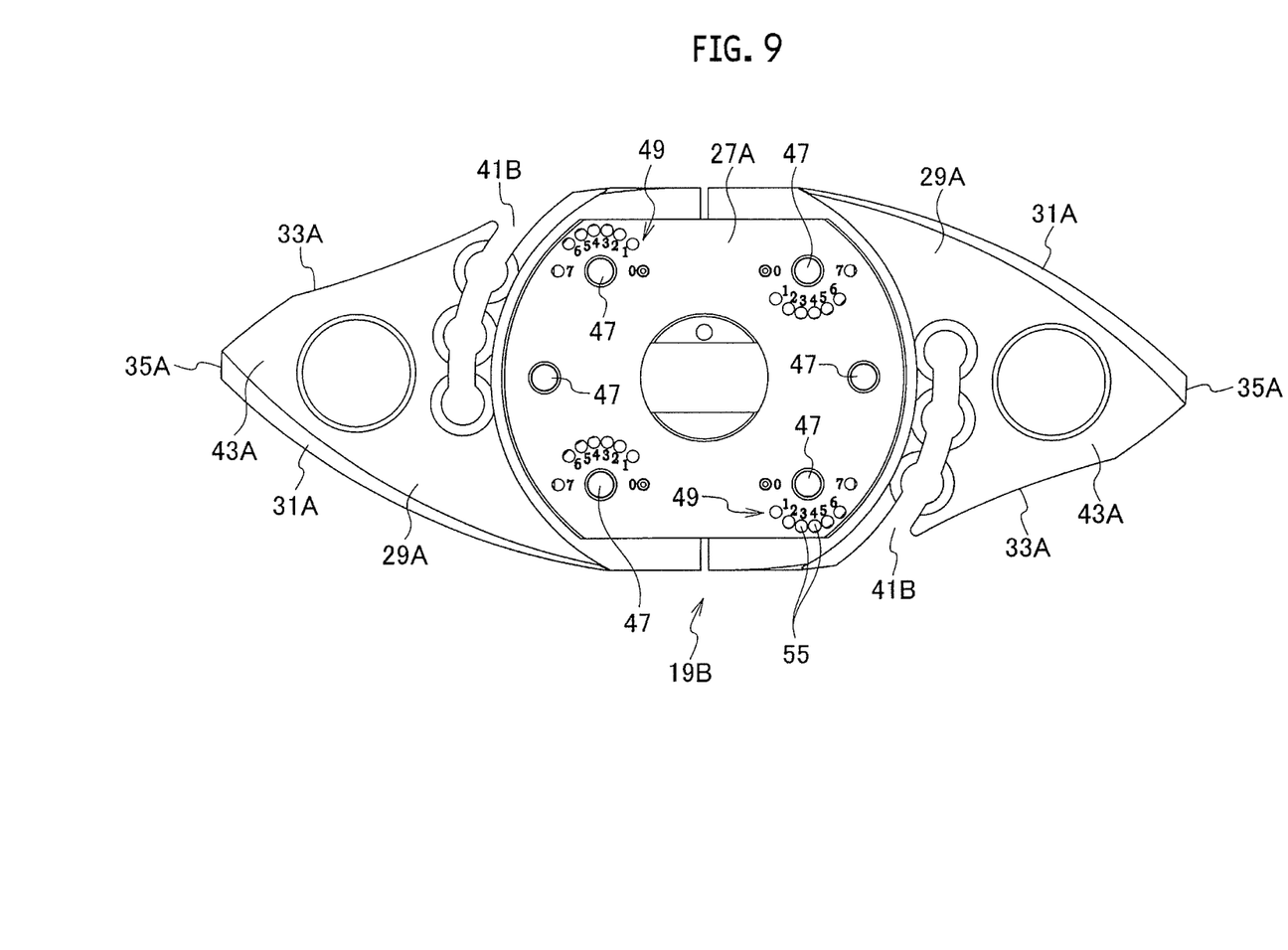
FIG. 9 is a plan view for explaining the shutter piece according to the fourth embodiment.

FIGS. 8 and 9 show a shutter piece 19B according to a fourth embodiment of the present invention. The shutter piece 19B includes an attachment base 27A corresponding to the attachment base 27 of the shutter piece 19. Half shutter pieces 29A corresponding to the half shutter pieces 29, respectively, are attached to the attachment base 27A via a plurality of attachment screws 47. Each of the half shutter pieces 29A includes a pressing side surface 31A and a non-pressing side surface 33A corresponding to the pressing side surface 31 and the non-pressing side surface 33, respectively. The half shutter piece 29A also includes a distal end part 35A corresponding to the distal end part 35.

Figure 10:
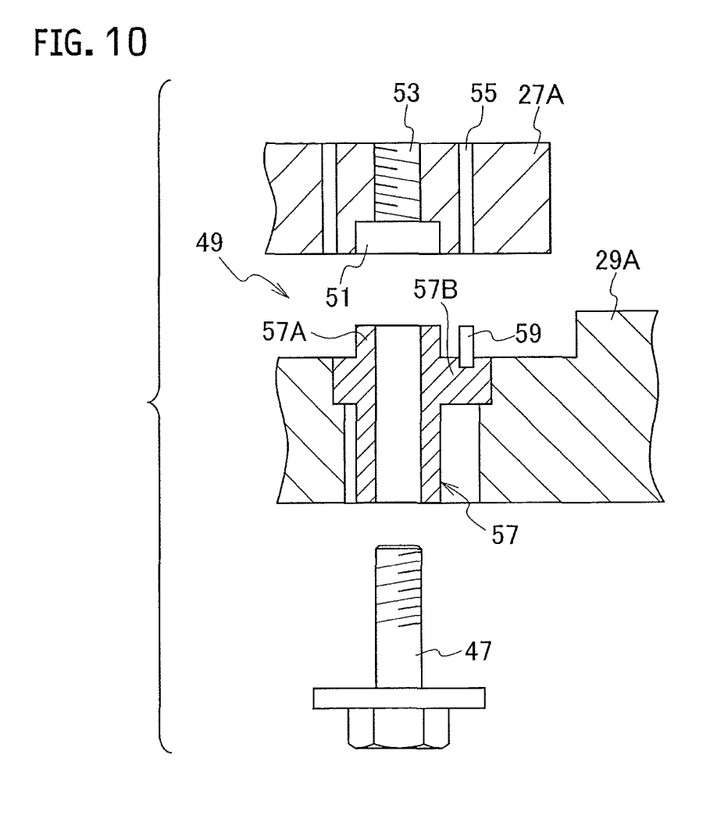
FIG. 10 is a cross-sectional view for explaining an eccentricity adjustment mechanism.

The half shutter pieces 29A are attached to the attachment base 27A to be capable of being adjusted individually in directions toward or away from each other. That is, an eccentricity adjustment mechanism 49 is respectively provided at a plurality of positions of the attachment base 27A. The eccentricity adjustment mechanism 49 is as shown in FIG. 10. That is, circular concave portions 51 are formed on a lower surface of the attachment base 27A and screw holes 53 are communicated through at the center positions of the concave portions 51, A plurality of engagement holes 55 are pierced around each of the screw holes 53 (see FIGS. 8 and 9).

The half shutter piece 29A includes an eccentric member to be capable of rotating, and the eccentric member 57 has a shaft portion 57A that is capable of being fitted into the concave portion 51. An eccentric cam portion 57B is provided integrally with the eccentric member 57, and the eccentric cam portion 57B includes an engaging pin 59 that is capable of engaging in or disengaging from the engagement hole 55. The attachment screw 47 has a distal end portion that is capable of being screwed into the screw hole 53 through the half shutter piece 29A and the eccentric member 57.

With the configuration described above, when the eccentric member 57 is appropriately turned with respect to the half shutter piece 29A to fit the shaft portion 57A of the eccentric member 57 into the concave portion 51 of the attachment base 27A and also the engaging pin 59 included in the eccentric cam portion 57B of the eccentric member 57 is engaged in one of the engagement holes 55 at an appropriate position, the half shutter piece 29A is adjusted in the position slightly rightward or leftward in FIG. 10 with respect to the attachment base 27A. The attachment screw 47 is then screwed into the screw hole 53 and fastened, so that the attachment base 27A and the half shutter piece 29A can be fixed in an integrated manner.

As can be understood from the above descriptions, the positions of the respective half shutter pieces 29A can be individually adjusted with respect to the attachment base 27A of the shutter piece 19B. In other words, when the distal end part 35A of each of the half shutter pieces 29A wears, the attachment state of each of the half shutter pieces 29A with respect to the attachment base 27A can be adjusted according to an amount of the wear. Therefore, the state of pressing contact between the distal end part 35A of each of the shutter pieces 29A and the pressing side surface 31A of the adjacent shutter piece 29A can be always adjusted to an appropriate contact state. At that time, the half shutter pieces 29A can be adjusted individually with respect to the attachment base 27A. Therefore, even if there is a manufacturing error or a difference in the thermal expansion between the half shutter pieces 29A, such an error or difference can be easily handled.

A slit 41B as a flexure allowance part is formed in each of the half shutter pieces 29A of the shutter piece 19B. The slit 41B includes a flexure-amount adjustment mechanism 61 for adjusting the amount of flexure of a distal-end side portion 43A of the shutter piece 19B. More specifically, the slit 41B includes a plurality of pin insertion portions 63A, 63B, and 63C at appropriate intervals. An adjustment pin 65 as an example of a slit-gap restricting member is removably inserted into one of the pin insertion portions 63A, 63B, and 63C at an appropriate position.

Therefore, when the distal-end side portion 43A flexes so as to narrow the gap of the slit 41B, the slit 41B catches the adjustment pin 65 therein, which limits the amount of flexure of the distal-end side portion 43A. When the amount of flexure of the distal-end side portion 43A is to be adjusted, the adjustment can be performed by selecting one of the pin insertion portions 63A, 63B, and 63C. Alternatively, a plurality of adjustment pins 65 having different diameters can be provided. In this case, also by selecting one of the adjustment pins 65 with a desired diameter and inserting the selected adjustment pin 65 into a desired one of the pin insertion portions 63A, 63B, and 63C, a clearance between the outer peripheral surface of the adjustment pin 65 and the inner peripheral surface of the pin insertion portion 63A, 63B, or 63C can be adjusted to adjust the amount of flexure of the distal-end side portion 43A. Furthermore, the amount of flexure of the distal-end side portion 43A can be adjusted also by providing a plurality of adjustment pins 65 having different elastic coefficients and selecting one of the adjustment pins 65 having a desired one of the elastic coefficients.

When the adjustment pins 65 with different diameters or the adjustment pins 65 with different elastic coefficients are provided, it is also possible to provide one of the pin insertion portions 63A, 63B, and 63C as a desired position.

Figure 11:
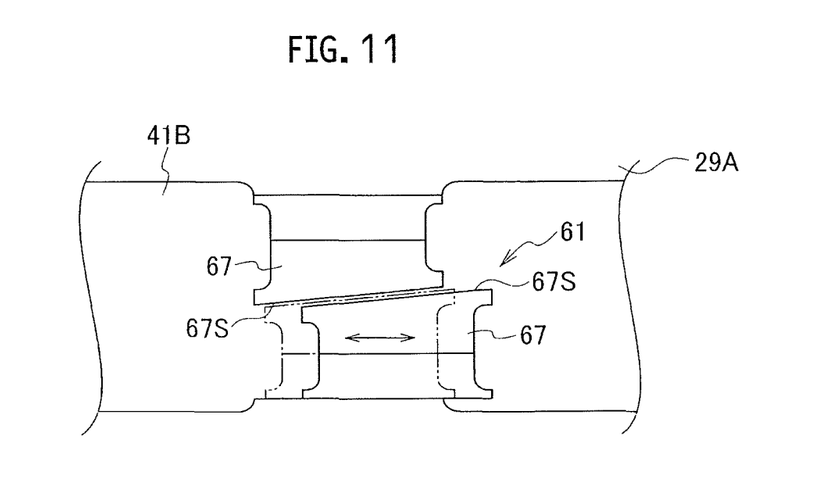
FIG. 11 is an explanatory diagram in which a slit part is viewed as a planar view and showing an example of a flexure-amount adjustment mechanism.

Alternatively, the flexure-amount adjustment mechanism 61 can have a configuration as shown in FIG. 11. That is, inclined members 67 as an example of the slit-gap restricting members that have inclined surfaces 67S facing each other are provided at an appropriate position in the slit 41B to face in a gap direction of the slit 41B. At least one of the inclined members 67 is configured in such a manner that the position thereof can be adjusted in the longitudinal direction (the direction of arrows) of the slit 41B. With this configuration, a distance between the inclined surfaces 67S of the inclined members 67 can be adjusted to a desired value. Therefore, the amount of flexure of the distal-end side portion 43A of the half shutter piece 29A can be limited and the amount of flexure can be adjusted.

The flexure-amount adjustment mechanism 61 can have a configuration in which another slit having an appropriate clearance and an appropriate length is provided in parallel with the slit 41B.

That is, any configuration can be used as the flexure-amount adjustment mechanism 61 as long as the gap size (width size) of the slit 41B can be limited so as not to become smaller than necessary. For example, various configurations such as a configuration including a spacer or a block with an appropriate thickness within the slit 41B can be adopted.

According to the configuration described above, an excessive constant pressure in a case where the distal end parts 35A of the shutter pieces 19B press the pressing side surfaces 31A of the adjacent shutter pieces 19B and slide thereon can be suppressed. Therefore, even when the shutter pieces 19B are thermally expanded, the contact pressure can be adjusted to an appropriate value.

Heat releasing parts 69 for releasing heat of the shutter pieces 19B in a case where the distal end parts 35A of the shutter piece 19B are in pressing contact with the pressing side surfaces 31A of the adjacent shutter pieces 19B and slide thereon, thereby causing frictional heat as described above are provided. More specifically, as shown in FIG. 8, a through hole 71 that vertically passes through is formed in the distal-end side portion 43A of each of the half shutter pieces 29A of the shutter piece 19B. A pipe member 73 made of metal having a high thermal conductivity is fitted (inserted) into the through hole 71.

According to the configuration described above, heat generated by sliding friction between the distal end part 35A of the half shutter piece 29A and the pressing side surface 31A of the adjacent half shutter piece 29A tends to be accumulated in the half shutter pieces 29A. However, when the heat of the half shutter pieces 29A transmits to the heat releasing parts 69, the heat is released by the heat releasing parts 69. Therefore, the half shutter pieces 29A can be suppressed from becoming a high temperature due to the heat accumulated in the half shutter pieces 29A.

Because the heat releasing part 69 has a configuration in which the pipe member 73 made of metal is fitted into the through hole 71 that vertically passes through the half shutter piece 29A in the present embodiment, an upward flow of air occurs in the pipe member 73, which enables heat releasing and cooling of the half shutter piece 29A.

As the configuration of the heat releasing part 69, a configuration including a hole or a groove that is open on the upper and lower surfaces, or a combination thereof to increase the surface area of the half shutter piece 29A can be used instead of the through hole. In this case, to increase the contact surface with air flowing relative to the surface of the half shutter piece 29A at the time of rotation of the half shutter piece 29A, the surface can be pleated.

As can be understood from the above descriptions, temperature increase in the shutter piece 19B can be suppressed and thermal expansion can be suppressed because the heat releasing part 69 is provided in each of the half shutter pieces 29A of the shutter piece 19B.

When the shutter pieces having the configuration described above are attached to the rotating shafts 17 of the shutter device 15 in the food shaping device 1 described above, respectively, to perform cutting and shaping of the crusted food dough, the closing operation is performed while flexure of the distal-end side part of each of the shutter pieces in the opposite direction from the closing operation direction in which each of the shutter pieces performs the closing operation is allowed due to the operation of the flexure allowance parts included in the respective shutter pieces. Therefore, the cutting and shaping of the crusted food dough can be performed while the contact pressure at which the distal end part of each of the shutter pieces contacts the pressing side surface of the adjacent shutter piece is always kept at an adequate value.

Therefore, occurrence of frictional heat caused by friction between the distal end part of each of the shutter pieces and the pressing side surface of the adjacent shutter piece can be suppressed, which can suppress an increase of load resulting from thermal expansion of the shutter piece.

In the above descriptions, a case where shutter pieces are rotated in one direction to perform the cutting and shaping of the crusted food dough has been described. However, the cutting and shaping of the crusted food dough can be performed by reciprocating (swinging) the shutter pieces. Furthermore, as described in Patent Literature 4 listed above, the shutter pieces can be also applied to shutter pieces in the shutter device that gathers a periphery portion of a sheet-like crust toward a center portion.

While the invention of the present application has been explained based on embodiments described above, the present invention is not limited to the above embodiments and can be variously modified without departing from the scope of the invention.

The entire contents of Japanese Patent Application No. 2014-212346 (applied on 17 Oct. 2014) and Japanese Patent Application No, 2014-014735 (applied on 29 Jan. 2014) are incorporated herein by reference.

The invention claimed is:

1. A shutter piece of a food shaping device that is configured to open and close an enclosure surrounded by at least three of the shutter pieces, the shutter piece comprising:
    a flexure allowance part that allows flexure of a distal-end side portion of the shutter piece, during closing of the shutter piece, in a direction opposite to a closing direction, between a rotation center position of the shutter piece and a distal end part of the shutter piece, the distal end part of the shutter piece being separated from a base part of the shutter piece by a slit or a notch that provides flexure and that extends from a non-pressing side surface of the shutter piece towards a pressing side surface of the shutter piece.

2. The shutter piece according to claim 1, wherein the flexure allowance part includes a flexure-amount adjustment mechanism that adjusts an amount of flexure of the distal-end side portion of the shutter piece.

3. The shutter piece according to claim 1, wherein
    the distal end part being separated from the base part by the slit, and
    the slit includes a slit-gap restricting member that is configured to restrict reduction of a slit gap during flexure of the distal-end side portion, the slit-gap restricting member comprises an adjustment pin, a spacer or a block that is removably inserted into the slit.

4. The shutter piece according to claim 1, wherein the distal-end side portion includes a heat releasing part that releases heat of the shutter piece; and
    the heat releasing part includes a through hole that vertically extends through the distal-end side portion, or a hole or a groove that is open on upper and lower surfaces of the distal-end side portion, or a combination of said through-hole and said hole or groove.

5. The shutter piece according to claim 1, wherein the shutter piece comprises two half shutter pieces of a same shape provided to an attachment base member including an attachment hole to be attached to rotating shafts of a shutter device of the food shaping device, respectively, the two half shutter pieces are symmetrical and are configured to be individually adjusted in directions toward or away from each other.

6. A food shaping device including the shutter piece according to claim 1, the food shaping device comprising:

the at least three of the shutter pieces are removably provided to a plurality of rotating shafts included in a shutter device of the food shaping device, respectively;

a food-dough supply that supplies food dough of a crust and a filling in a space provided by the shutter pieces that are opened and closed by rotation of the rotating shafts; and a conveyance that conveys food products shaped by closing of the shutter pieces to a next step, wherein the closing is performed while the flexure allowance part included in each of the shutter pieces allows flexure of the distal-end side portion of each of the shutter pieces in the direction opposite to the closing direction.

7. The shutter piece according to claim 3, wherein the slit-gap restricting member comprises a plurality of the adjustment pins having different diameters or different elastic coefficients.

8. The shutter piece according to claim 1, wherein the distal end part being separated from the base part by the slit, and the slit includes a flexure-amount adjustment mechanism which is configured such that inclined members having inclined surfaces facing each other are provided in the slit to face each other in a gap direction of the slit.

9. A shutter of a food shaping device that is configured to open and close an enclosure surrounded by at least three of the shutters, the shutter comprising:

a flexure allowance part that allows flexure of a distal end side portion of the shutter during closing of the shutter, the flexure being in a direction opposite to a closing direction, between a rotation center position of the shutter and a distal end of the shutter, the shutter comprising two half shutters each having a same shape and provided to an attachment base including an attachment hole for attachment to rotating shafts of a shutter device of the food shaping device, respectively, the half shutters being symmetrical and being configured to be individually adjusted in directions towards and away from each other.

10. A shutter of a food shaping device that is configured to open and close an enclosure surrounded by at least three of the shutters, the shutter comprising:

a flexure allowance part that allows flexure of a distal end side portion of the shutter during closing of the shutter, the flexure being in a direction opposite to a closing direction, between a rotation center position of the shutter and a distal end part of the shutter, the flexure distal end part of the shutter being separated from a base of the shutter by a slit that provides flexure, the slit comprising a slit gap restricting member that is configured to restrict reduction of a slip gap during flexure of the distal end side portion, the slit gap restricting member comprising an adjustment pin, a spacer or a block removably insertable into the slit.

11. The shutter piece according to claim 9, wherein the flexure allowance part includes a flexure-amount adjustment mechanism that adjusts an amount of flexure of the distal-end side portion of the shutter piece.

12. The shutter piece according to claim 10, wherein the flexure allowance part includes a flexure-amount adjustment mechanism that adjusts an amount of flexure of the distal-end side portion of the shutter piece.

13. The shutter piece according to claim 9, wherein the distal-end side portion includes a heat releasing part that releases heat of the shutter piece; and the heat releasing part includes a through hole that vertically extends through the distal-end side portion, or a hole or a groove that is open on upper and lower surfaces of the distal-end side portion, or a combination of said through-hole and said hole or groove.

14. The shutter piece according to claim 10, wherein the distal-end side portion includes a heat releasing part that releases heat of the shutter piece; and the heat releasing part includes a through hole that vertically extends through the distal-end side portion, or a hole or a groove that is open on upper and lower surfaces of the distal-end side portion, or a combination of said through-hole and said hole or groove.

15. A food shaping device including the shutter piece according to claim 9, the food shaping device comprising:

the at least three of the shutter pieces are removably provided to a plurality of rotating shafts included in a shutter device of the food shaping device, respectively;

a food-dough supply supplies food dough of a crust and a filling in a space provided by the shutter pieces are opened and closed by rotation of the rotating shafts; and a conveyance conveys food products shaped by closing of the shutter pieces to a next step, wherein the closing is performed while the flexure allowance part included in each of the shutter pieces allows flexure of the distal-end side portion of each of the shutter pieces in the direction opposite to the closing direction.

16. A food shaping device including the shutter piece according to claim 10, the food shaping device comprising:

the at least three of the shutter pieces are removably provided to a plurality of rotating shafts included in a shutter device of the food shaping device, respectively;

a food-dough supply supplies food dough of a crust and a filling in a space provided by the shutter pieces that are opened and closed by rotation of the rotating shafts; and a conveyance conveys food products shaped by closing of the shutter pieces to a next step, wherein the closing is performed while the flexure allowance part included in each of the shutter pieces allows flexure of the distal-end side portion of each of the shutter pieces in the direction opposite to the closing direction.

* * * * *